(12) United States Patent
Bushnell (10) Patent No.: US 8,315,359 B2
(45) Date of Patent: Nov. 20, 2012

(54) METHOD AND SYSTEM FOR ENABLING EMERGENCY CALLING FROM NOMADIC VOIP EXTENSION TELEPHONES

(75) Inventor: William J. Bushnell, St Charles, IL (US)

(73) Assignee: Alcatel Lucent, Paris (FR)

( * ) Notice: Subject to any disclaimer, the term of this patent is extended or adjusted under 35 U.S.C. 154(b) by 703 days.

(21) Appl. No.: 12/459,337

(22) Filed: Jun. 30, 2009

(65) Prior Publication Data

US 2010/0329433 A1   Dec. 30, 2010

(51) Int. Cl.
*H04M 11/04*   (2006.01)
(52) U.S. Cl. .................. 379/37; 379/88.21; 370/352
(58) Field of Classification Search .............. 379/37, 379/45, 88.19, 88.21, 142.04, 142.12; 370/352
See application file for complete search history.

(56) References Cited

U.S. PATENT DOCUMENTS

| | | | |
|---|---|---|---|
| 7,127,044 B1* | 10/2006 | Becker et al. | 379/45 |
| 2001/0028702 A1* | 10/2001 | Tanaka et al. | 379/37 |
| 2005/0122958 A1* | 6/2005 | Shim et al. | 370/352 |
| 2009/0022103 A1* | 1/2009 | Shatsky | 370/331 |
| 2010/0323665 A1* | 12/2010 | Ibe et al. | 455/411 |
| 2011/0019664 A1* | 1/2011 | Dickinson et al. | 370/352 |

* cited by examiner

*Primary Examiner* — Creighton Smith
(74) *Attorney, Agent, or Firm* — Fay Sharpe LLP (57) ABSTRACT

A method and system for handling calls to emergency telephone numbers by a VoIP telephone that is configured as an extension to a home telephone. The VoIP telephone is provided with a home telephone number that is different than the home telephone number. The location of the VoIP telephone is maintained in a caller ID location database and is regularly updated when necessary. Location updates are made at least when the VoIP telephone registers using a different IP address than was used for the most recent communication. The system is configured to enable the VoIP telephone to ring when a call is placed to the home telephone number. In addition, non-emergency calls from the VoIP telephone are accompanied by caller ID information associated with home telephone. In this way, VoIP telephones may be configured as extension telephones and used to make emergency calls, even when being used nomadically.

19 Claims, 6 Drawing Sheets

METHOD AND SYSTEM FOR ENABLING EMERGENCY CALLING FROM NOMADIC VOIP EXTENSION TELEPHONES

TECHNICAL FIELD

The present invention relates generally to the field of IP telephony, and, more particularly, to a method and system for enabling emergency calling from a VoIP extension telephone that is or may be nomadic, that is, able to operate at locations other than its home location.

BACKGROUND

For convenience, the following abbreviations are herewith defined, at least some of which are referred to within the following description of the state-of-the-art and the present invention.
CVoIP Carrier VoIP
DSL Digital Subscriber Line
GW Gateway
IMS IP Multimedia Subsystem
IP Internet Protocol
PC Personal Computer
PSAP Public Safety Answering Point
PSTN Public Switched Telephone Network
RTP Real-time Transport Protocol
SIP Session Initiation Protocol
TA Terminal Adaptor
VoIP Voice over Internet Protocol In a traditional PSTN, subscribers would be provided with telephones for use in a fixed location, such as a home or business. The telephone service provider would run a wire from its network to the premises, where it would typically terminate at a junction box. Another wire could then be run from the junction box to the telephone. Sometimes a circuit would connect two or more telephones to the junction box, allowing all of them to use the same telephone line to the provider network. The additional phones are traditionally called extension telephones. When the telephone rang, any or all of them could be used to answer the call, which will be heard on any telephone that is off-hook. An outgoing call could also be placed using any extension, though when a call is in process, it captured the line and no other calls can be initiated. In most modern installations, a number of telephone ports positioned throughout the premises are similarly connected in a circuit to the junction box, so that a telephone equipped with a suitable jack can be plugged in and used at any one of them. Of course, more than one telephone may be plugged in at one time, and if so they will operate the same as the extensions that are hardwired to the circuit.

A PSTN is a hierarchical network of switches through which a call made on the telephone line establishes a communication path to the called party. Each telephone converts the conversation into analog signals that are carried back and forth through this circuit and converted into audible conversation for the other party. This circuit between the calling party and the called party remains in place until the communication session is terminated, when the network resources, that is, the individual switches and interconnecting wires or cables, are freed so that they could be used for another telephone call.

More recently, the Internet and similar packet data networks have been used as an alternative to the existing PSTN. In this type of communication, a VoIP telephone converts the conversation into digital data packets that are transported through the network to the called party. The VoIP telephone may be an instrument designed for this use, or may be a regular analog telephone used in conjunction with a TA. Through the network, the packets are routed to a called party with a VoIP telephone that can convert the received packets back into an audible conversation. The packets may also be routed to a media gateway connected to a PSTN. The gateway is able to convert the digital packets into an analog signal communication session so that the call may be terminated at a regular analog telephone as well. The structure of this communication system will be described in more detail below.

VoIP subscribers may have extension telephones as well, so long as each telephone is able to access the network. Since the telephones do not reside on the same analog circuit, however, extension phone service is typically operated somewhat differently than with the PSTN. When a call for the location arrives, all extension telephones are contacted separately, and a communication session is established with the first one that answers; in this case the other extensions may not participate in the call.

Service providers offer a number of ancillary services in addition to simply enabling telephone calls between two parties. One popular service is caller ID, in which the calling party's telephone number is determined and transmitted to the called party along with the signal that causes their phone to ring. Equipped with an appropriate instrument, the called party is the able to view the number, and sometimes the identity of the caller if the system is so enabled, even before the call is accepted.

Naturally, subscribers may use caller ID to decide whether to accept an incoming call, but the service has also found other uses. Emergency numbers, such as 911, are directed to PSAPs near where the caller is located. The telephone service provider is aware of the address of the subscriber as well as their phone number, and so they provide this information to the PSAP along with the caller's telephone number. As should be apparent, this can be of great value in emergency situations, especially where the caller is not physically able to communicate effectively.

With VoIP services, however, a problem dealing with emergency service calls may arise. This is because VoIP telephones may be installed in devices like laptop computers, which are frequently carried around by a subscriber when they travel. The subscriber may then place telephone calls wherever network access is available. If the "nomadic" telephone is configured as an extension to the subscriber's home telephone, it will ring when the subscriber's number is dialed, and allow them to answer the call regardless of their location. For many uses, this may be quite advantageous; the subscriber may in this way simply use their home telephone number regardless of where they are located. The caller ID feature still operates, that is, parties called from the VoIP telephone are still presented with the caller's home number. While this is desirable in a number of circumstances, it frustrates operation of the emergency response system.

When a subscriber places an emergency call using a nomadic extension telephone, their home caller ID information is used when routing the call. A PSAP provided with this information may access a location database to look up the associated address and, if the subscriber is unable to communicate effectively, the emergency response will be dispatched to the home address. Not only does the subscriber fail to get the needed assistance, but the emergency crews sent to the wrong location will be tied up and unavailable for a genuine emergency in their area. For these reasons, in some areas emergency calls may not be permitted from VoIP extension telephones.

Accordingly, there has been and still is a need to address the aforementioned shortcomings and other shortcomings associated with emergency call service availability for nomadic VoIP extension telephones. These needs and other needs are satisfied by the present invention.

SUMMARY

The present invention is directed to enabling emergency calls from VoIP extension telephones, especially those that are operating, or are capable of operating nomadically. In one aspect, the present invention is a method for providing emergency call services to a VoIP extension telephone including receiving a call from a VoIP telephone, determining whether the call is an emergency call and, if so, routing the call associated with a first caller ID to a PSAP, and routing the call, if it is determined not to be an emergency call, to its non-emergency destination, the call in this case being associated with a second caller ID. The method may also include determining the location of a VoIP extension telephone, and updating a caller ID location database.

In another aspect, the present invention provides a method for enabling a nomadic emergency-call capability in a VoIP extension telephone including providing the extension telephone with a home telephone number, the home telephone number associated with a home telephone, providing the extension telephone with a hidden telephone number, associating the hidden telephone number with the home telephone number, and determining the current location of the extension telephone.

In yet another aspect, the present invention provides a system for enabling emergency calls from VoIP extension telephones including an IMS core for determining whether a call is an emergency call, routing the call to a telephony feature server if it is not, and routing the call to an emergency access gateway if it is. The system also includes a telephony feature server for re-assigning caller ID information to non-emergency calls from the VoIP extension telephone so as to provide the home telephone information to the called party. The telephony feature server may also enable both the VoIP extension telephone and the home telephone with which it is associated to ring when a call is directed to the home telephone is made.

Additional aspects of the invention will be set forth, in part, in the detailed description, figures, and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to enabling emergency calls from VoIP extension telephones, especially those that are operating, or are capable of operating nomadically. That is, to a manner of enabling a VoIP extension telephone to be both nomadic and emergency-call capable. As used herein, VoIP is a set of technologies that enable voice (audio) communication over the Internet or some other network operating according to a packet transport protocol.

A VoIP telephone is the user device associated with the provision of VoIP services. A VoIP telephone my be a single physical device, or may be a standard analog telephone used in conjunction with a TA. The TA converts the analog signal into a packetized data stream for transmission though an IP network, and accepts and translates received transmissions as well.

An extension telephone is one that is alerted and receives calls that are directed to a home telephone. The home telephone may be but is not necessarily located at a fixed location or address. In the context of routine telephone calls, the extension telephone rings (or otherwise alerts) when calls are made to the number associated with the home telephone and, in addition, in most cases presents the same caller ID information to a called party as the home telephone regardless of the location of the extension telephone user. As mentioned above, the nature of a VoIP extension telephone may pose problems when contacting an emergency services provider, especially when the extension telephone is not co-located with the home telephone. The present invention seeks to ameliorate this difficulty. A network configured according to the present invention will now be described in reference to FIG. 1.

Figure 1:
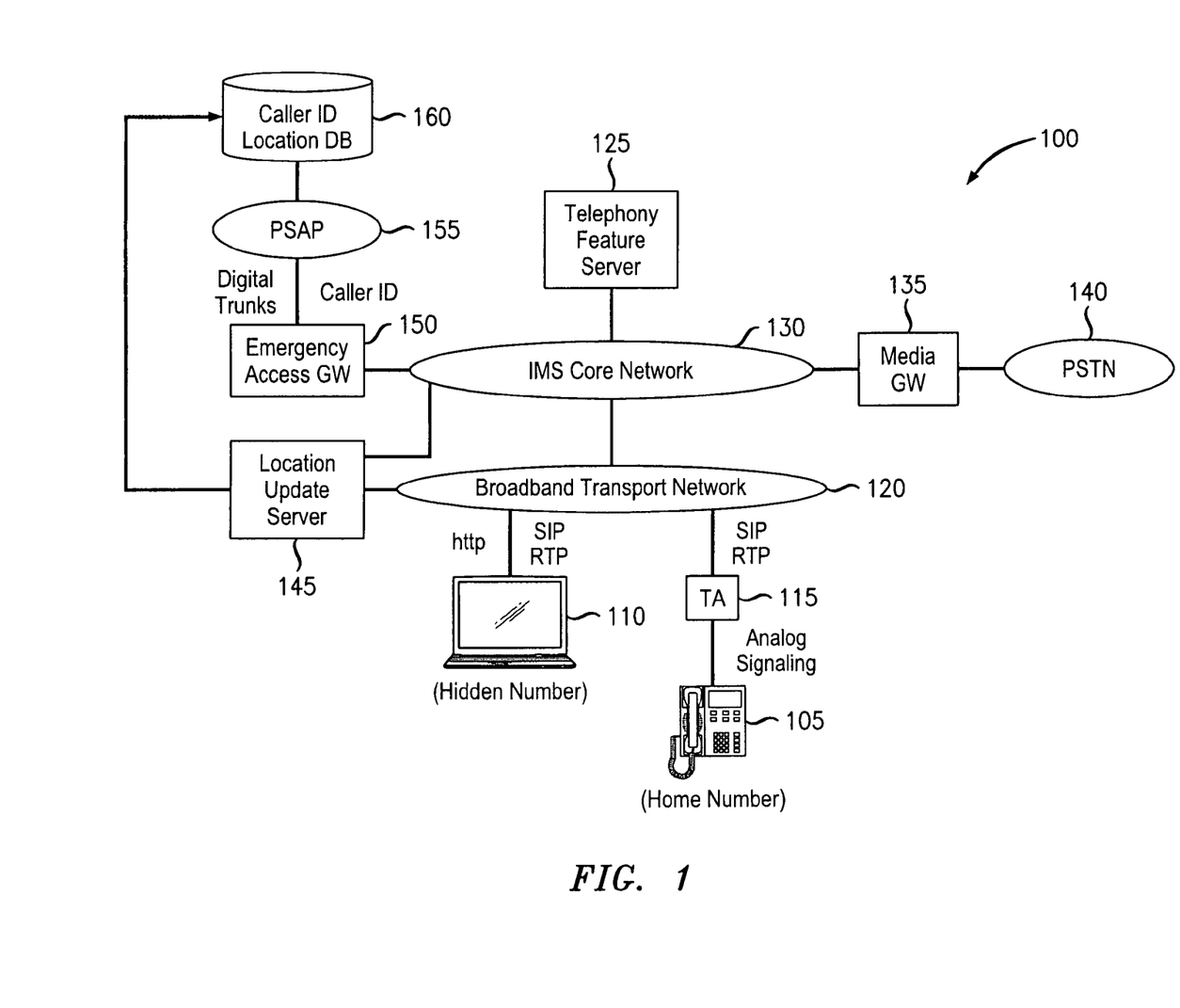
FIG. 1 is a simplified schematic diagram illustrating a telecommunications system configured according to an embodiment of the present invention.

FIG. 1 is a simplified schematic diagram illustrating a telecommunications system 100 configured according to an embodiment of the present invention. A home telephone 105 is connected to the telecommunications system 100 via a TA 115, which converts the analog signaling of home telephone 105 into packets suitable for digital network transmission. TA 115 then communicates with a broadband transport network 120 operated by a service provider. As indicated in FIG. 1, in this embodiment, the analog signals of home telephone 105 are converted into signaling using the SIP and transporting packets according to the RTP. A VoIP extension telephone 110 is likewise connectable to the broadband transport network 120. VoIP extension telephone 110 is in this embodiment VoIP capable and installed in a personal computer; therefore, no TA is required. Note that the present invention may be implemented in other telephone arrangements as well. In accordance with the present invention, the home telephone 105 is provided with a home number, and the VoIP extension telephone is provided with a second number, referred to herein as a "hidden number" because its existence need not be visible to the subscriber or to most of those with whom the subscriber communicates.

The broadband transport network is in turn connected to an IMS core network 130, which routes the traffic toward its proper intended destination. In the context of the present invention, this includes routing calls to a PSTN 140 via media gateway 135, or to a PSAP 155 via an emergency access gateway 150. In accordance with the present invention, the core network 130 is provided with a filter to determine which calls are emergency calls. A telephony features server 125 may also be accessed in order to invoke certain services, including a caller ID assignment feature.

The caller ID assignment feature, generally speaking, allows for the assignment of a caller identity other than the one that would otherwise be associated with the calling telephone. As should be apparent, this feature operates only under the supervision of the service provider—as a general principle, individual callers are not usually allowed to assign a specific caller ID to their own calls. In accordance with this embodiment of the present invention, the telephony features server 125 assigns caller ID information associated with the home telephone number to non-emergency calls made from the VoIP extension telephone 110.

As shown in FIG. 1, telecommunications system 100 also includes a caller ID location database 160 which PSAPs may consult in order to determine the location of the party calling an emergency services number. A location update server 145 receives location information related to callers, after which it may update the caller ID location database 160. In this embodiment, home telephone 105 is provided with a home telephone number associated with a fixed location. This location can be stored in the caller ID location database 160 for use by PSAP 155.

In accordance with this embodiment of the present invention, the VoIP extension telephone 110 operates as an extension telephone for most (that is, non-emergency calls) calls. While the VoIP extension telephone 110 is provisioned with a different telephone number than the one associated with home telephone 105, when a call is directed to the number associated with the home telephone 105, the VoIP extension telephone 110 also rings. When the VoIP extension telephone 110 places a non-emergency call, the caller ID associated with the home telephone 105 is displayed for the called party. When the VoIP extension telephone 110 places an emergency call, however, the caller ID information associated with the hidden telephone number accompanies the call. The caller ID location database maintains a current address for the hidden number, which is updated as needed by the location update server 145.

Note that as used herein, the term "home" is not limited to a subscriber's residence, but may also include a place of business as well. Also, in some embodiments, the home telephone may be a mobile telephone.

Figure 2:
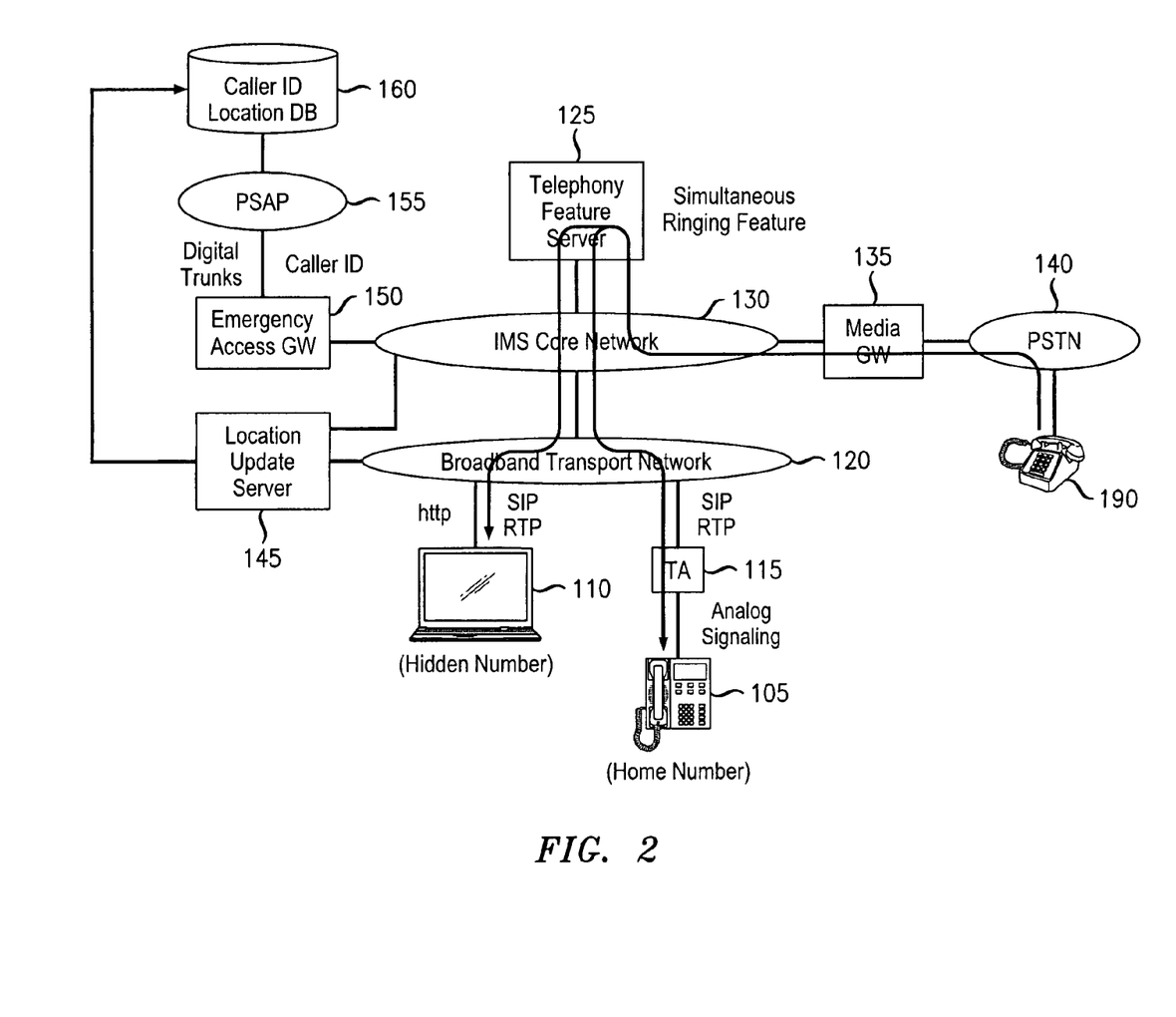
FIG. 2 is a simplified schematic diagram illustrating the path of an incoming call though the network according to an embodiment of the present invention.

FIG. 2 is a simplified schematic diagram illustrating the path of an incoming call though network 100 according to an embodiment of the present invention. In this case it will be presumed that a call is made from a PSTN telephone 190 to the telephone number associated with home telephone 105. Since home telephone 105 is (through operation of TA 115) a VoIP telephone, the PSTN 140 routes the call through the media gateway 135 to the IMS core network 130. The IMS core network 130 then routes the call to the telephony features server 125, where the home telephone number is associated with the hidden number of VoIP extension telephone 110. Both home telephone 105 and VoIP extension telephone are alerted, and the call will be completed to whichever of them first answers the call. Here it is noted that in order to be able to receive the alert and answer the call, VoIP extension telephone 110 must be in communication with the IMS core network 130 in some way, though it does not have to be co-located with home telephone 105. The VoIP extension telephone 110 therefore serves as an extension telephone even when it is nomadic.

Figure 3:
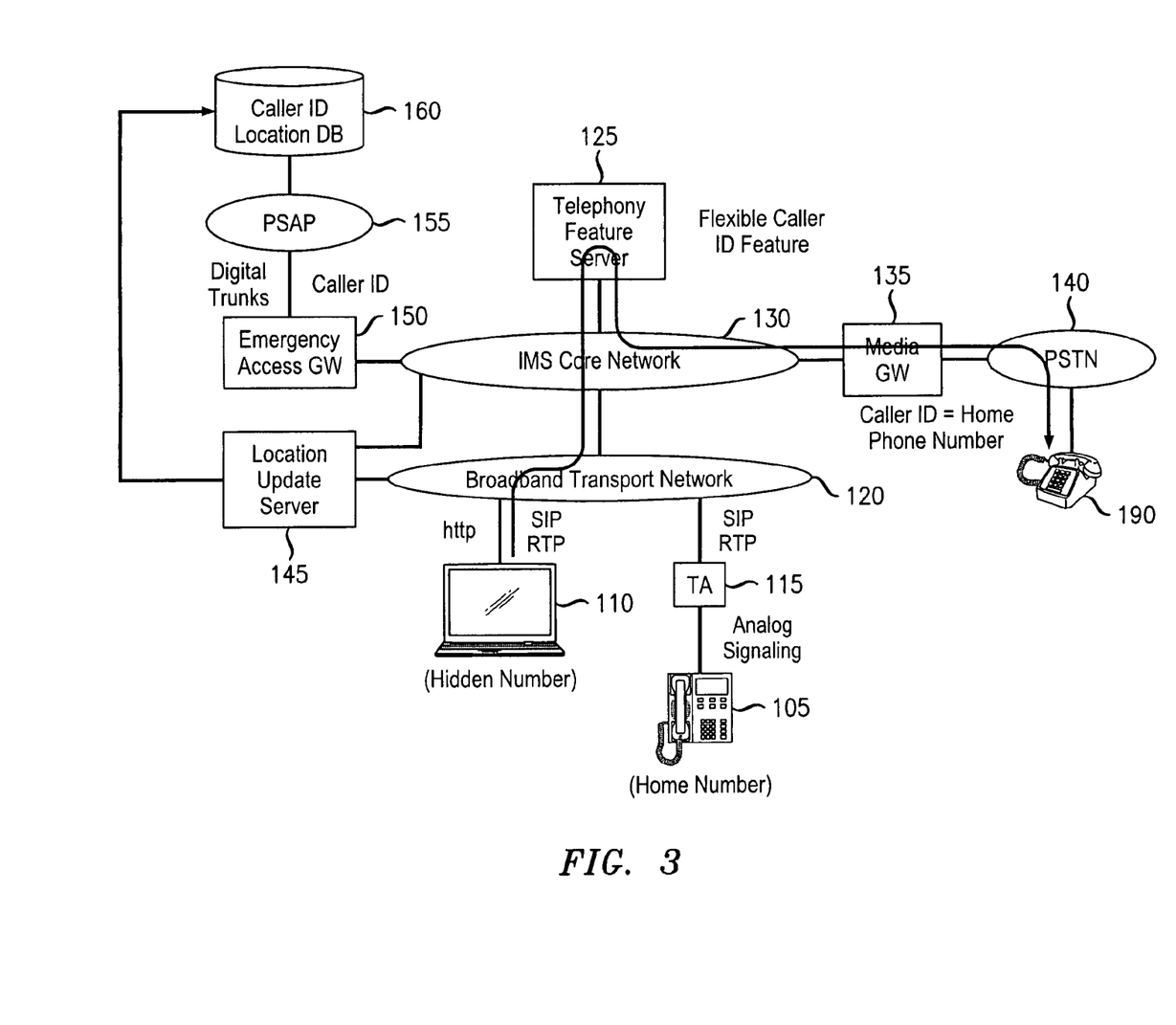
FIG. 3 is a simplified schematic diagram illustrating the path of an outgoing call from VoIP extension telephone though the network according to an embodiment of the present invention.

FIG. 3 is a simplified schematic diagram illustrating the path of an outgoing call from VoIP extension telephone 110 though network 100 according to an embodiment of the present invention. When VoIP extension telephone 110 initiates a telephone call, the call is routed to the IMS core network 130 via the broadband transport network 120. The IMS core network 130 determines that the call is a non-emergency call. The IMS core network 135 then routes the call to the telephony features server 125, where the call from the VoIP extension telephone 110 is assigned the caller ID information of the home telephone 105. The call is then forwarded to the media gateway 135 via the IMS core network 130. From media gateway 135, the call can be routed through the PSTN 140 to the PSTN telephone 190, its intended destination. At PSTN telephone 190, the caller ID information associated with home telephone 105 will be available for presentation to the user.

Figure 4:
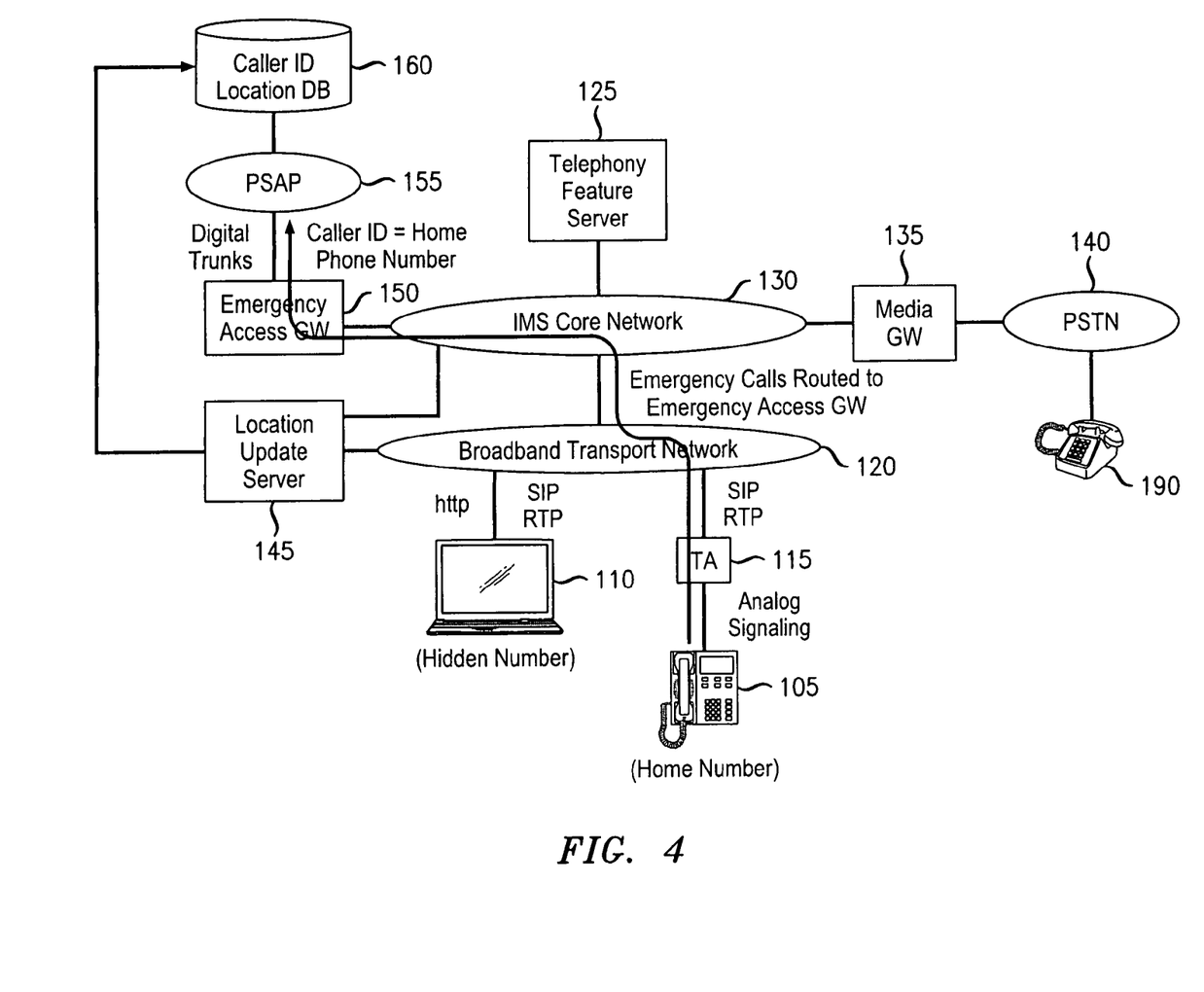
FIG. 4 is a simplified schematic diagram illustrating the path of an emergency call from a home telephone though the network according to an embodiment of the present invention.

FIG. 4 is a simplified schematic diagram illustrating the path of an emergency call from home telephone 105 though network 100 according to an embodiment of the present invention. When telephone 105 (and TA 115) is used to place an emergency call, the call is routed to the IMS core 130 via the broadband transport network 120. IMS core network 130 is configured with a filter that perceives that an emergency call has been placed and forwards the call to the emergency gateway 150. The call is then forwarded to PSAP 155 along with the caller ID information associated with the home telephone 105. When the PSAP consults the caller ID location database 160, of course, the address of the caller will be found to be the home address.

Figure 5:
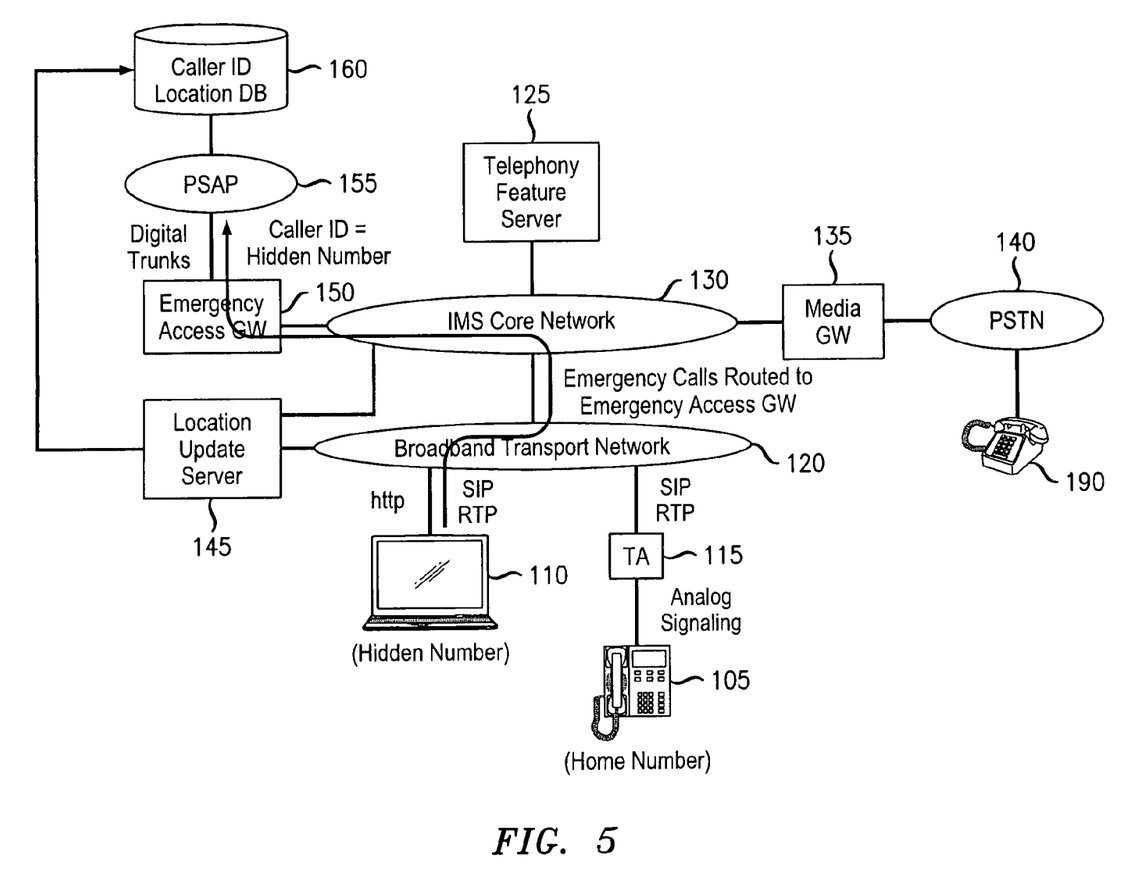
FIG. 5 is a simplified schematic diagram illustrating the path of a non-emergency call from VoIP extension telephone though the network according to an embodiment of the present invention.

FIG. 5 is a simplified schematic diagram illustrating the path of an emergency call from VoIP extension telephone 110 though network 100 according to an embodiment of the present invention. When an emergency call is placed from VoIP extension telephone 110, it is likewise routed to the IMS core network 130 via the broadband transport network 120. The IMS core network 130, configured with a filter that perceives that an emergency call has been placed, forwards the call to the emergency gateway 150. The call is then forwarded to PSAP 155 along with the caller ID information associated with the hidden number of the VoIP extension telephone 110. When the PSAP 155 consults the caller ID location database 160, the location of the VoIP extension telephone is provided. Note that this may or may not be the home address.

Figure 6:
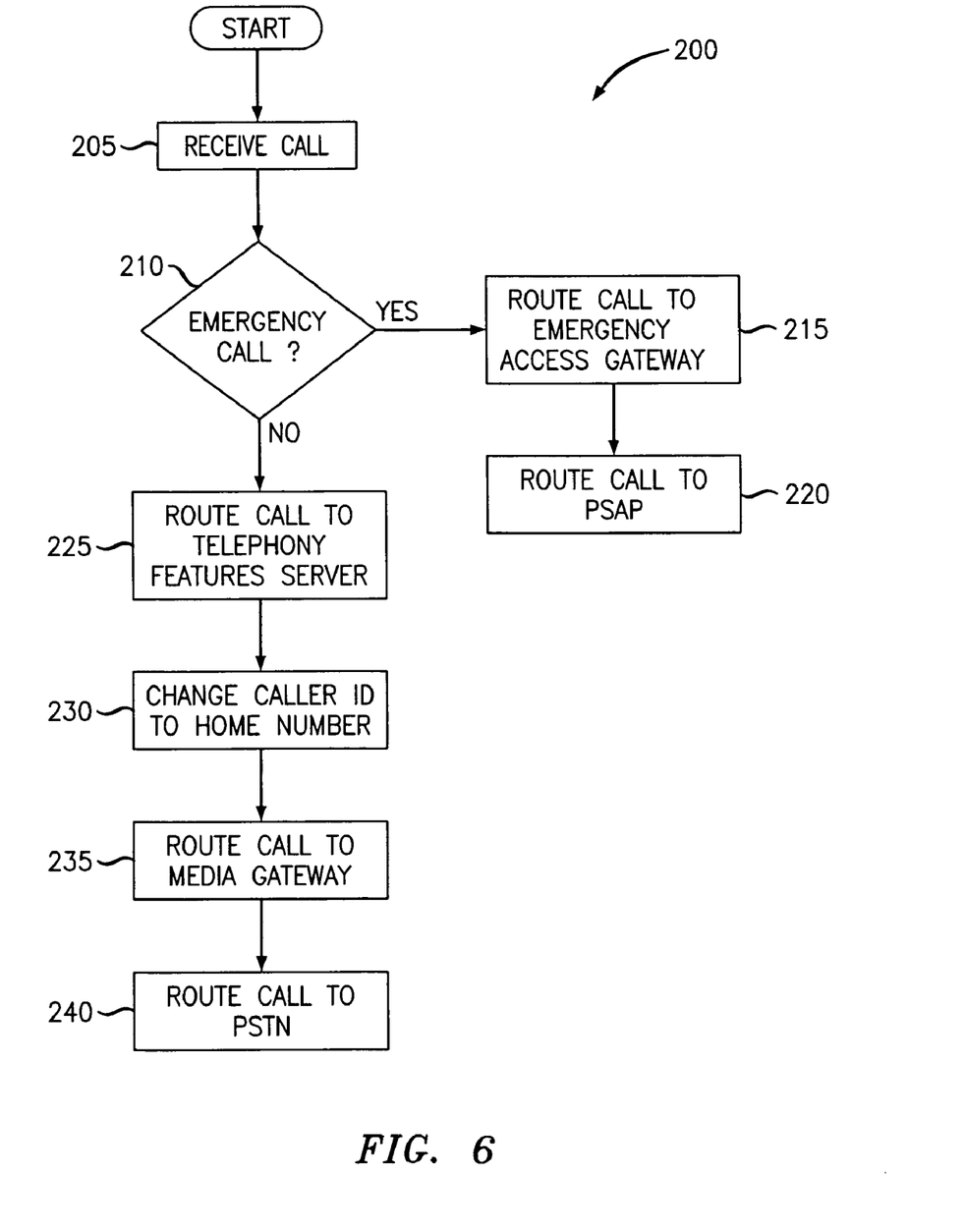
FIG. 6 is a flow diagram illustrating a method of handling a call from a VoIP extension telephone according to an embodiment of the present invention.

FIG. 6 is a flow diagram illustrating a method 200 of handling a call from a VoIP extension telephone according to an embodiment of the present invention. At START, it is presumed that the components necessary to performing the method are available and operational. In accordance with the present invention, this includes providing the VoIP extension telephone with a hidden number and associating the hidden number with a home telephone number in a telephony features server (steps not shown). The process then begins when a call from the VoIP extension telephone is received (step 205). For each call received from the VoIP extension telephone it is first determined whether the call is an emergency call (step 210). An emergency call may be one directed to 911 (or its local variant) or, in some implementations, to another number recognized as an emergency number in some way. For example, an emergency number database might be maintained, or in some networks telephone numbers with a particular prefix might be used to indicate emergency numbers.

In an alternative embodiment, a subscriber may be offered the option to designate certain numbers as emergency numbers. In another alternative, the subscriber may be able to designate specific calls as emergency calls.

Returning to the embodiment of FIG. 6, if the call is determined at step 210 to be an emergency call, then it is routed immediately to an emergency access gateway (step 215). The emergency access gateway also receives the caller ID information associated with the calling party which, in this embodiment, includes the hidden number of the VoIP extension telephone. The emergency access gateway then routes the call to a PSAP (step 220), which uses, as necessary, the caller ID information associated with the hidden number to provide emergency services to the caller.

As mentioned above, the location of the caller can be ascertained from the caller ID information association associated with hidden number. In one embodiment, caller location is provided to the emergency access gateway when the call is routed there; in another embodiment, the emergency access gateway retrieves the location information form the caller ID location database prior to routing the call to the PSAP. In yet another embodiment, retrieval of the caller location information is relegated to the PSAP itself.

In any event, the caller location information associated with the hidden number is the most current location information available to the telecommunications system. In one embodiment, in order to keep this location information up to date, the subscriber is queried to provide new address information whenever use of a new IP address is perceived at registration. In a preferred embodiment, this would include any use of the personal computer or other device on which the VoIP extension telephone is resident. In an alternate embodiment, the current location information may be obtained from a user device that is capable of determining its own location in some way, for example by using the GPS or by reading bar codes or RFIDs located in a hotel room. In this embodiment, it is preferred that the user device is capable of communicating with the PC or other device on which the VoIP extension telephone is resident in order to confirm that the two devices are actually co-located. In any case, whenever a new location for the VoIP extension telephone is obtained, the location update server preferably updates the location information in the caller ID location database.

In another alternate embodiment (not shown), if the telecommunications system is unable to confirm the accuracy of the VoIP extension telephone's current location, for example if a new IP address is being used but no new location information can be obtained, then the PSAP is provided with notice that the location information may not be current.

Returning to the embodiment of FIG. 6, if the call from the VoIP extension telephone is determined at step 210 to be a non-emergency call, then the call is routed to the telephony features server (step 225). The telephone features server re-assigns the caller ID information for the call to that of the home telephone number rather than the hidden number. In this way, the call made by the VoIP extension telephone will appear to the recipient as being made from the home telephone.

In the embodiment of FIG. 6, when the caller ID information has been changed to reflect the information associated with the home telephone number, the call is routed to a media gateway (step 235), and from there it is routed to a PSTN (step 240) so that the called party can be alerted (step not shown).

In this manner, a VoIP extension telephone is enabled to make an emergency call, and accurate caller information provided, even when the VoIP telephone is operating from a location that is not its home location. The PSAP handling the emergency call has some assurance that the caller location information being provided by the telecommunication system is correct and can be relied on when making decisions regarding how to respond to the call.

Note that the operations illustrated in FIG. 6 may be performed in any logically-consistent sequence, and that other steps may be added and, in some cases removed, without departing from the spirit of the invention.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method for providing emergency call services to a VoIP extension telephone, comprising:
   receiving in a network a call from the VoIP extension telephone;
   determining whether the call is an emergency call;
   routing the call, if it is determined to be an emergency call, to a PSAP associated with a first caller ID;
   routing the call, if it is determined not to be an emergency call, to its non-emergency destination associated with a second caller ID.

2. The method of claim 1, wherein routing the call to a PSAP comprises routing the call to an emergency access gateway.

3. The method of claim 1, wherein routing the call to its non-emergency destination comprises routing the call to a telephone features server for re-assignment of caller ID.

4. The method of claim 1, wherein routing the call to its non-emergency destination comprises routing the call to a media gateway.

5. The method of claim 1, further comprising determining the location of the VoIP extension telephone.

6. The method of claim 5, wherein determining the location of the VoIP extension telephone comprises sending a query to the subscriber.

7. The method of claim 6, wherein the query is sent to another device associated with the VoIP extension telephone subscriber.

8. The method of claim 5, further comprising maintaining a record of the IP address last used for network access by the VoIP extension telephone, and wherein the location determination is performed only if the call is placed using an IP address different from the last-used IP address.

9. The method of claim 1, wherein the second caller ID is associated with a home telephone location.

10. The method of claim 1, wherein the first caller ID is associated with a hidden number assigned to the VoIP extension telephone.

11. The method of claim 1, further comprising notifying the PSAP that the caller location associated with the call routed to the PSAP cannot be verified.

12. A method for enabling a nomadic emergency-call capability in a VoIP extension telephone, comprising:
   providing the VoIP extension telephone with a home telephone number, the home telephone number associated with a home telephone;
   providing the VoIP extension telephone with a hidden telephone number;
   associating the hidden telephone number with the home telephone number; and determining the current location of the VoIP extension telephone;

wherein associating the hidden telephone number with the home telephone number comprises enabling the VoIP extension telephone associated with the hidden telephone number to alert when a call is directed to the home telephone number.

13. The method of claim 12, wherein the home telephone number is associated with a fixed location.

14. The method of claim 13, wherein the home telephone is a VoIP telephone.

15. The method of claim 14, wherein the home telephone is a mobile telephone.

16. The method of claim 15, further comprising determining the current location of the home telephone.

17. A system for enabling emergency calls from a VoIP telephone that is configured as an extension of a home telephone but is provided with a different telephone number than the home telephone number, the system comprising:

a telephony feature server for re-assigning caller ID information to non-emergency calls from the VoIP extension telephone so as to provide the home telephone information to the called party;

an IMS core for determining whether a call is an emergency call, routing the call to a telephony feature server if it is not, and routing the call to an emergency access gateway if it is an emergency call.

18. The system of claim 17, further comprising a location update server for updating a caller ID location database whenever a new location for the VoIP extension telephone is obtained.

19. The system of claim 18, further comprising a broadband transport network for receiving calls from the VoIP extension telephone and routing the calls to the IMS core network.

* * * * *